United States Patent

Maass et al.

Patent Number: 5,528,086
Date of Patent: Jun. 18, 1996

[54] MOTOR VEHICLE ANTI-THEFT DEVICE WHICH BLOCKS STARTING OF THE ENGINE

[75] Inventors: Manfred Maass, Esslingen; Martin Fritz, Ruderberg, both of Germany

[73] Assignee: Mercedes-Benz AG, Germany

[21] Appl. No.: 394,327

[22] Filed: Feb. 23, 1995

[30] Foreign Application Priority Data

Feb. 23, 1994 [DE] Germany .................. 44 05 708.3

[51] Int. Cl.⁶ .................................................. B60R 25/04
[52] U.S. Cl. ................... 307/10.5; 180/287; 340/310.01
[58] Field of Search ................... 307/10.1–10.6; 180/287; 70/DIG. 46; 123/198 DC; 340/426, 825.31, 825.32, 825.34, 825.45, 825.69, 825.72, 825.71, 310.01, 310.02, 310.06, 310.07, 310.08; 370/85.1, 85.9

[56] References Cited

U.S. PATENT DOCUMENTS

| 4,209,709 | 6/1980 | Betton | 180/287 |
|---|---|---|---|
| 4,288,778 | 9/1981 | Zucker | 180/287 |
| 4,463,340 | 7/1984 | Adkins et al. | 180/287 |
| 4,682,062 | 7/1987 | Weinberger | 307/10.4 |
| 4,887,263 | 12/1989 | Steely | 370/85.1 |
| 5,103,932 | 4/1992 | Hansen et al. | 180/287 |
| 5,138,986 | 8/1992 | Aguilar | 307/10.4 |

FOREIGN PATENT DOCUMENTS

| 2358211A1 | 5/1975 | Germany . |
|---|---|---|
| 3613605A1 | 11/1987 | Germany . |

Primary Examiner—William M. Shoop, Jr.
Assistant Examiner—Richard T. Elms
Attorney, Agent, or Firm—Evenson, McKeown, Edwards & Lenahan

[57] ABSTRACT

The invention provides a motor vehicle anti-theft system in which an authorization code, representing the access authorization, is transmitted via the vehicle starting line arranged downstream from the ignition switch, to a start release unit. A control unit for the engine start, previously in an engine-start-blocking condition, is thereby placed into a release condition, in which it transmits a start request (arriving from the starting line) to the starter motor. By using the starting line for transmitting the authorization code, it is achieved that the latter is coupled through a connection which is necessary for the start, and therefore cannot fail separately.

4 Claims, 2 Drawing Sheets

MOTOR VEHICLE ANTI-THEFT DEVICE WHICH BLOCKS STARTING OF THE ENGINE

BACKGROUND AND SUMMARY OF THE INVENTION

This invention relates to a motor vehicle having an anti-theft arrangement which blocks the starting of the engine. In motor vehicles of this type, the theft protection consists of the fact that the engine can be started only if an access-authorizing code signal is entered by the user, which causes the generation of a start release signal. A control unit permits the operation of the engine only when the start release signal is present, so that the vehicle can not be started without the possession of the valid access code.

An anti-theft measure of this type is described, for example, in the firm brochure "Diebstahlschutz für das Auto" ("Theft Protection for the Automobile") of the firm TEMIC TELEFUNKEN microelectronic GmbH, printing date: August 1993. In that case, a transponder which is integrated into the car key transmits in a contactless manner specific data to an electronic analysis system whose receiver coil is integrated in the ignition lock.

German Patent Document DE-OS 23 58 211, discloses a protection circuit for ignition systems, in which unauthorized starting of the vehicle is prevented by interruption or disturbance of the ignition process, (particularly by the interruption of the ignition coil circuit), which interruption can be overridden by an electronic circuit situated partially in the ignition key and partially in the vehicle proper. Insertion of the ignition key into the ignition lock operates to override the previous disturbance of the ignition process.

U.S. Pat. No. 4,209,709 also discloses an anti-theft arrangement which operates by blocking the start of the engine. An anti-theft circuit has an input connected to the starting line originating from an ignition starting switch, and activates an engine start when it receives a start request signal generated by the closing of an ignition starting switch while it is in an engine-start releasing condition. The anti-theft circuit can be switched between the engine-start-releasing condition and an engine-start-blocking condition by means of an input code signal entered through the ignition starting switch itself as a defined sequence of switch-on and switch-off conditions, with predetermined time intervals required between successive switch conditions. The anti-theft circuit is adapted specifically to this code input implemented by way of the switch disposed in front of it. Logic elements, buffering trigger elements and time delay devices are utilized to pass a start request signal only if the predetermined switch condition sequence was recognized beforehand.

For anti-theft systems in motor vehicles, it is also known to use a central electronic control system of the motor vehicle, which also performs engine control functions. The control is inactive in an inoperative position, and can be switched-over to an active operating condition only by the entry of a predetermined user code by way of a user-side electronic key. See, for example, German Patent DE-OS 36 13 605 A1.

An object of the present invention is to provide a motor vehicle with a functionally reliable and secure protection against unauthorized starting of a vehicle engine, which is as protected from tampering or manipulation to the greatest extent possible, and can be implemented with low circuit-technological expenditures.

This object is achieved according to the invention by a motor vehicle anti-theft device in which the unit that generates the activating signal for the starter is used as the engine-start-blocking and releasing control unit, and the starting line (that is, the existing starting current path) is used to transmit the start release signal, so that no additional line is required. Such dual utilization of the starting line is possible because it otherwise carries current only during starter operation. Thus, at other times, (particularly before the operating of the ignition starting switch), it can be used to transmit other information. Another advantage of this arrangement is that the start release signal is transmitted by means of a connection which is necessary for starting the engine, so that if the connection fails the vehicle cannot be started. Thus, a separate failure of the anti-theft system (that is, failure to block an engine start) cannot occur.

In a further embodiment of the invention, a start release unit, which recognizes the start release signal, and a control unit, which activates the starter, are components of an electronic engine control system. This type of an anti-theft arrangement can thus be implemented by a small number of additional hardware and/or software measures on a conventional electronic engine control system.

For vehicles which already have an anti-theft system that recognizes the access authorization, a further embodiment of the invention is particularly advantageous in that the anti-theft system provides the start release system and feeds it to the starting line where it can be taken off by the control unit. Additional modules for providing the start release signal are therefore not required.

Other objects, advantages and novel features of the present invention will become apparent from the following detailed description of the invention when considered in conjunction with the accompanying drawings.

DETAILED DESCRIPTION OF THE DRAWING

Figure 1:
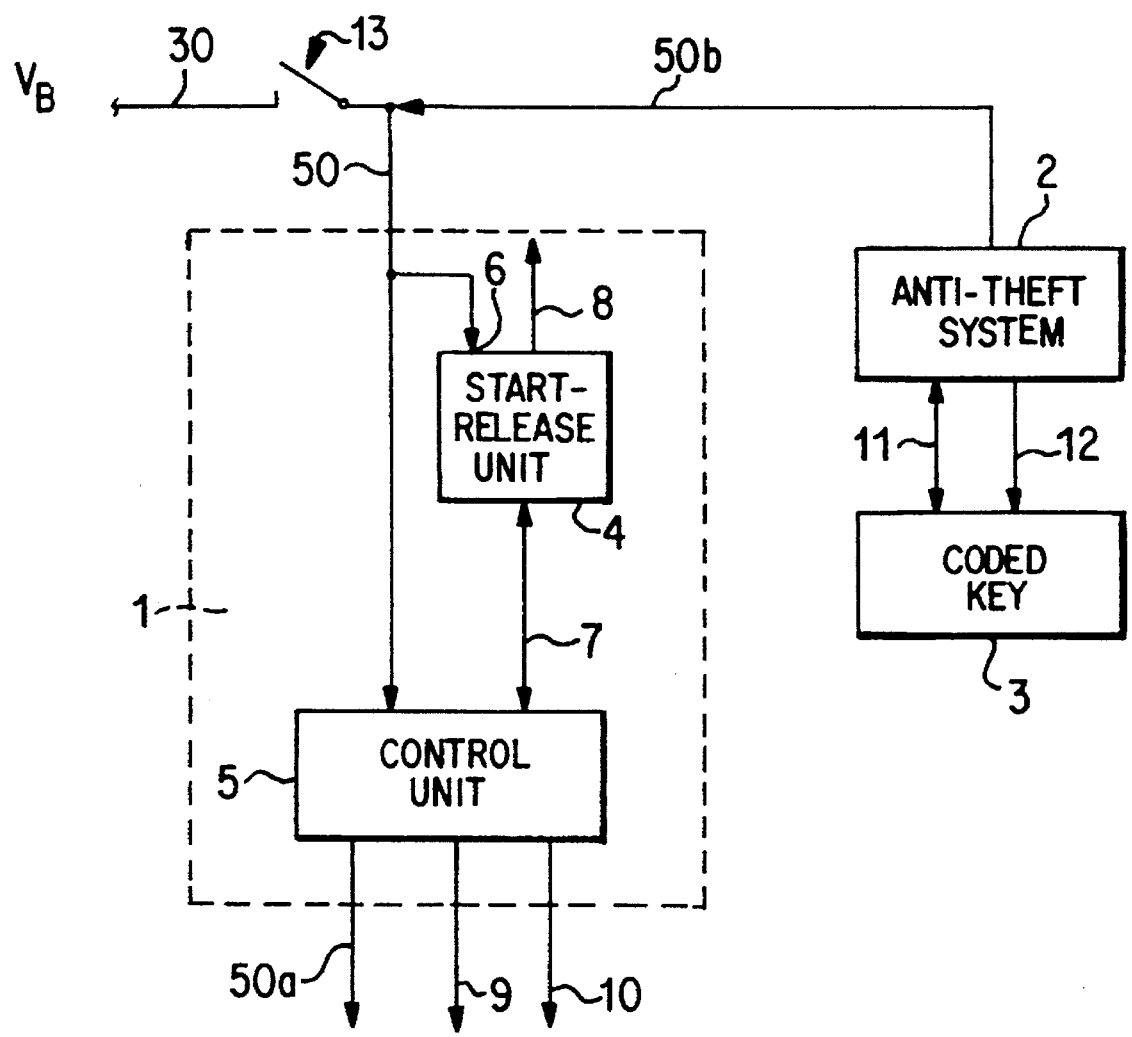
FIG. 1 is a block diagram of an anti-theft arrangement according to the invention which operates by blocking the engine start of a motor vehicle having an electronic engine control system and an anti-theft system.

The motor vehicle provided with the anti-theft arrangement shown in FIG. 1 has an electronic engine control system 1 (indicated by an interrupted line), which has a start release unit 4 and a control unit 5. The control unit 5 is connected to the starting line 50 (that is, the standardized terminal 50 of the electric system of the vehicle), which leads from the ignition starting switch 13 to the starter motor (not shown).

In a vehicle without an electronic engine control system, the positive battery voltage on line 30 (that is, the standardized terminal 30), is coupled by closing ignition starting switch 13, through the starting line 50 directly to the starter motor, as a start request signal. The interposition of the control unit 5 in the starting line 50 has the effect that, when the ignition starting switch 13 is closed, the positive voltage actuates the control unit 5, which recognizes the starting request. Thereafter, when the control unit is in an engine-start-releasing condition, it activates the starter motor by way of the line continuation 50a to the starter motor, and carries out additional given functions, for example, protection against a start while the engine is running, start abortion and the like.

The control unit 5 is used not only for control of the starting operation, but also for engine control while the engine is running. Thus, as shown in FIG. 1, the control unit 5 also has a control output line 9 for controlling the fuel supply, as well as a control output line 10 for controlling the ignition, if it exists in the vehicle.

The start release unit 4 is connected with the control unit 5 by a bi-directional signal line 7, and with the starting line 50 by a start release signal input 6. By means of an information output line 8, via an implemented engine start release, it can also transmit information sent by way of the signal line 7 by the control unit 5 to the vehicle. Naturally, as required, the electronic engine control system 1 will comprise additional modules and signal lines which in this case are not of interest and are therefore not shown. It is also apparent that the start release unit 4, the control unit 5 and other components of the electronic engine control system can be implemented in the form of software or hardware, with a desired degree of integration as individual modules or as a common module.

The motor vehicle according to the invention also comprises an anti-theft system 2 which, for identification purposes, can be addressed by a coded key 3 by way of a bidirectional information channel 11 which, together with an additional transmitter channel 12, permits the transmission of suitable signals from the anti-theft system 2 to the coded key 3. In a conventional manner, these signal connections 11, 12 permit an authorization code recognition which is highly resistant to manipulation. If the correct code is fed into the anti-theft system 2, it generates a release signal which is sent to different vehicle elements, for example, for actuating the central locking system.

In addition to these conventional authorization functions (not shown in detail in FIG. 1), the anti-theft system 2 generates an engine start release signal which can be transmitted to the starting line 50, to which the start release signal output of the anti-theft system 2 is connected by way of a signal line 50b.

By means of this circuit-technological construction, the following method of operation of the starter-blocking anti-theft system is achieved.

When the vehicle engine is switched off, the control unit 5, by means of a corresponding control, enters an engine-start-blocking condition in which it will send no starter-activating signal over the corresponding line 50a, even when the input side is acted upon by the start request signal by way of the starting line 50. Thus, the starter motor remains inoperative even when the ignition starting switch 13 is operated. The switch-over of the control unit 5 between the engine-start-releasing condition and the engine-start-blocking condition may be accomplished in a conventional manner, with which a person skilled in the art is familiar, such as the control of a switch at the output of the starter line 50a.

After operation of an access-authorizing coded key 3 (which may be implemented mechanically or as a remote control), the vehicle-side anti-theft system 2 recognizes the access authorization as a result of the data exchange with the key 3 by way of the signal channels 11, 12, and thereupon generates an engine start release signal in the form of a serial data signal, which is transmitted via lines 50b and 50, to the start-release unit 4, which recognizes the start release signal. Such recognition of the start release signal, and differentiation with respect to the positive battery voltage signal when the ignition starting switch 13 is closed, are ensured by the use of a different response level.

As an alternative, coupling-out of the start release data signal can be carried out by the earlier transmission of a key message from the anti-theft system 2 to the starting line 50, and thus to the start release unit 4. Furthermore, as required, serial transmission of the data signal may also be protected by an arbitrarily encoded data exchange between the data anti-theft system 2 and the electronic engine control system 1 (specifically the start release unit 4), with respect to any tampering with or manipulation of the anti-theft system 2 or its start release data signal. For this purpose, the start release signal input 6 of the start release unit 4 will also be used as a signal output for such a code data exchange.

Upon recognition of the engine start release signal, the start release unit 4 emits an operating-state-changing signal to the control unit 5 (and alternatively, to additional existing components of the electronic engine control system 1, as well). When this start release signal is received, the control unit 5 enters an engine-start-releasing condition in which it transmits an activating signal to the starter motor on the output line 50a as soon as an engine start is requested by the closing of the ignition starting switch 13, so that it is acted upon by way of the starting line 50 by the start request signal. After the starting of the engine, the control unit 5, in a conventional manner, takes over the further engine control, such as the fuel supply control, ignition control and the like.

Figure 2:
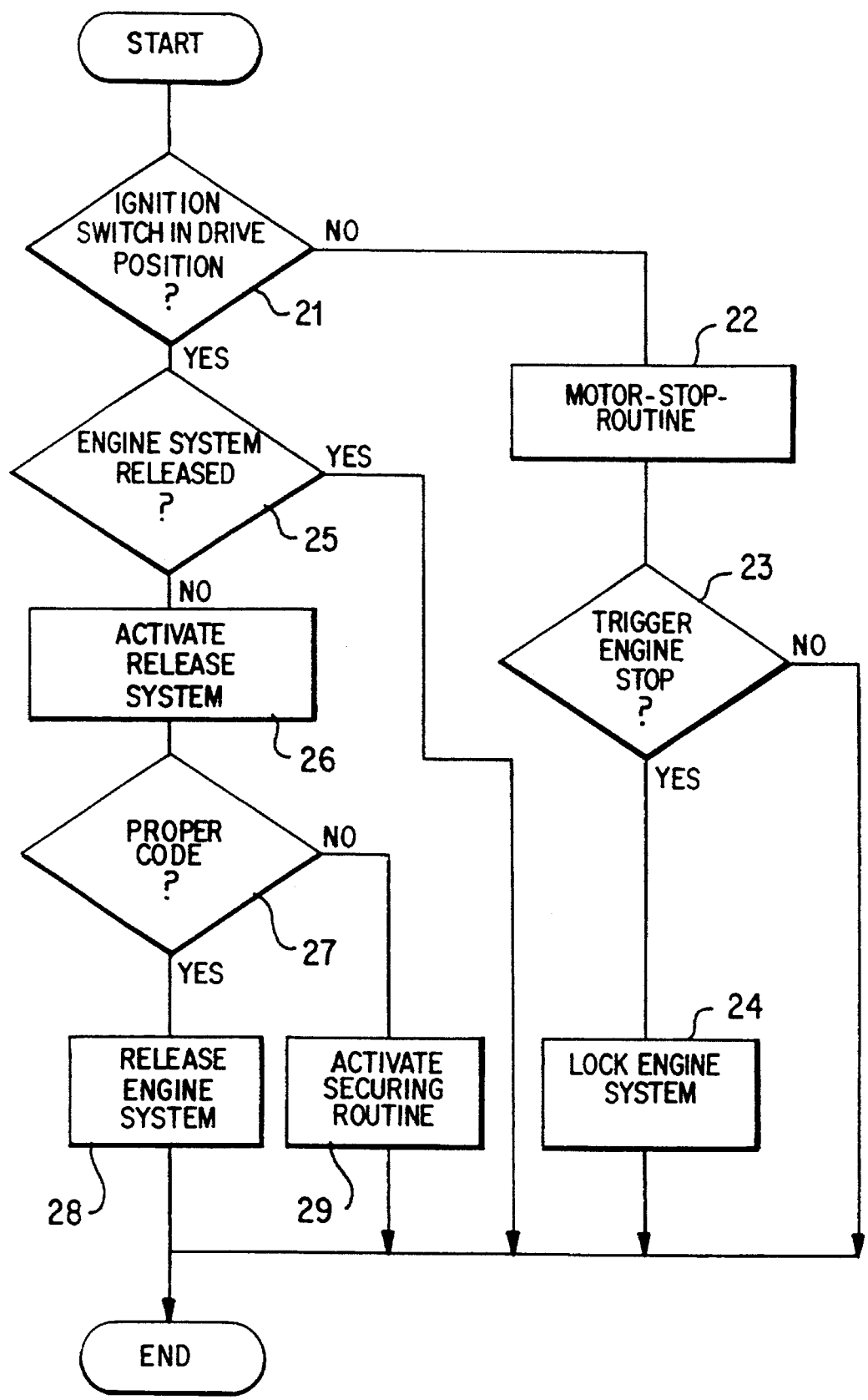
FIG. 2 is a flow chart which illustrates the operation of the anti-theft arrangement of FIG. 1.

FIG. 2 is a flow chart which illustrates the operation of the anti-theft arrangement of FIG. 1. The process is initiated at step 21, where an inquiry is made whether the ignition switch is currently in the "drive" or "on" position. If not, then the system enters an engine stop routine (step 22) in which it is determined whether to trigger an engine stop (step 23). (If the engine is already stopped, of course, this is unnecessary, and processing is ended.) If an engine stop is triggered, then at step 22 the engine system enters the engine-start-blocking condition described previously, and processing is ended.

If in step 21, the ignition switch is in the drive position, a further inquiry is made at step 25 whether the engine is in the engine start release condition described previously. If it is, then further processing is unnecessary, and the engine may be started. If, however, the engine is not then in the engine start release condition, then the system enters an activate release routine (step 26) in which it is determined whether a release signal has been received (step 27). If so, the engine system is released to start (that is, it enters the engine start release condition) at step 28. If not, however, (that is, if the correct code is not received) then the system is secured (step 29) so that the engine cannot be started, even in the presence of a start request by the key switch 13 of FIG. 1.

By means of the above-described arrangement, an anti-theft system which is very secure with respect to tampering or manipulation is therefore achieved at lower hardware and technological expenditures, by blocking unauthorized starting of the engine. By feeding the start release signal into the starting line path 50, its transmission from the anti-theft system 2 is ensured because it is transmitted by means of a connection required for the start, and therefore cannot be separated without a functional failure.

It is clear that multiple modifications of the above-described embodiment are conceivable for a person skilled in the art within the framework of the invention. For example, in the case of vehicles without an anti-theft system, a separate device may be provided only for generating the engine start release signal, which device is designed so that it can be activated only by an access-authorized user.

Furthermore, in the case of vehicles without an electronic engine control system, the anti-theft arrangement according to the invention can be provided by inserting the vehicle the start release unit as well as a control unit which intervenes in the starting line in the vehicle electric system. In this case it is sufficient for the control unit to be able to take up two operating conditions: the engine-start-releasing condition (in which it transmits an arriving start request signal to the starter motor), and the engine-start-blocking condition (in which it emits no engine-starting starter-activating signal despite the arrival of a start request signal).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Motor vehicle anti-theft arrangement for blocking the starting of the engine, of the type having a user-code-specifically addressable system for generating an engine start release signal, and a control unit which, upon receipt of the start release signal, changes from an engine-start-blocking condition to an engine-start-releasing condition, wherein:

a starting line originating from an ignition starting switch is coupled in communication with the user-code-specifically addressable system and transmits the start release signal generated by said system; and an input to the control unit is connected to the starting line, said control unit distinguishes between a start release signal and a start request signal generated by the closing of the ignition starting switch, and to activate an engine start only when said control unit is in the engine-start-releasing condition and receives a start request signal.

2. Motor vehicle according to claim 1, wherein:

the control unit is included in a vehicle electronic engine control system which also comprises a start release unit, said control unit and said start release unit each having an input connected to the starting line;

the start release unit changes the control unit from an engine-start-blocking condition to the engine-start-releasing condition upon receipt of the start release signal; and the control unit emits an engine-start-activating signal only when it is in the engine-start-releasing condition and receives a start request signal.

3. Motor vehicle according to claim 1, wherein the user-code-specifically addressable system comprises a vehicle anti-theft system which can be activated by means of a coded key.

4. Motor vehicle according to claim 2, wherein the user-code-specifically addressable system comprises a vehicle anti-theft system which can be activated by means of a coded key.

\* \* \* \* \*